(12) United States Patent
Kochura et al.

(10) Patent No.: US 11,288,293 B2
(45) Date of Patent: Mar. 29, 2022

(54) METHODS AND SYSTEMS FOR ENSURING QUALITY OF UNSTRUCTURED USER INPUT CONTENT

(71) Applicant: INTERNATIONAL BUSINESS MACHINES CORPORATION, Armonk, NY (US)

(72) Inventors: Nadiya Kochura, Bolton, MA (US); Nicolo' Sgobba, Brno (CZ); Tiberiu Suto, Franklin, NY (US); Erik Rueger, Ockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 16/677,445

(22) Filed: Nov. 7, 2019

(65) Prior Publication Data

US 2021/0141815 A1 May 13, 2021

(51) Int. Cl.
*G06F 17/00* (2019.01)
*G06F 16/31* (2019.01)
*G06F 9/54* (2006.01)
*G06F 40/166* (2020.01)
*G06F 40/205* (2020.01)

(52) U.S. Cl.
CPC ............ *G06F 16/313* (2019.01); *G06F 9/542* (2013.01); *G06F 40/166* (2020.01); *G06F 40/205* (2020.01)

(58) Field of Classification Search
CPC .... G06F 16/313; G06F 40/166; G06F 40/205; G06F 9/542; G06F 16/3344; G06F 40/30; G06F 16/9535; G06F 40/211; G06F 40/289; G06F 16/338
USPC ........................................................ 707/748
See application file for complete search history.

(56) References Cited

U.S. PATENT DOCUMENTS

| 8,290,799 | B2 | 10/2012 | Andreas et al. |
| 9,569,782 | B1 | 2/2017 | Lavery |
| 10,102,851 | B1* | 10/2018 | Kiss ..................... G10L 15/1822 |
| 10,885,910 | B1* | 1/2021 | Antos ..................... G06F 3/167 |
| 2013/0018892 | A1* | 1/2013 | Castellanos ............ G06Q 50/01 |
| | | | 707/748 |
| 2018/0150552 | A1* | 5/2018 | Wang .................. G06F 16/3344 |

(Continued)

FOREIGN PATENT DOCUMENTS

| CN | 101699131 B | 4/2010 |
| CN | 101699434 B | 3/2013 |

(Continued)

*Primary Examiner* — Jason T Edwards
(74) *Attorney, Agent, or Firm* — Griffiths & Seaton PLLC

(57) ABSTRACT

Embodiments for managing natural language user input are provided. Natural language input is received from a user utilizing a computing node. The natural language input is analyzed. The analyzing of the natural language input includes attempting to identify at least one of an intent associated with the natural language input, an entity associated with the natural language input, and context data associated with the natural language input. The natural language input is evaluated against a pre-trained model based on the analyzing of the natural language input. A quality score for the natural language input is calculated based on the evaluating of the natural language input. An action is caused to be performed utilizing the computing node based on the calculated quality score.

18 Claims, 9 Drawing Sheets

(56) References Cited

U.S. PATENT DOCUMENTS

2018/0268728 A1* 9/2018 Burdis .................. G09B 19/06
2020/0184019 A1* 6/2020 Yu .......................... G06F 40/30
2020/0320984 A1* 10/2020 Kuczmarski .......... G10L 15/005

FOREIGN PATENT DOCUMENTS

| CN | 109377197 A | 2/2019 |
| JP | 5956000 B2 | 7/2016 |
| JP | 2017129830 A | 7/2017 |
| WO | 2001080096 A1 | 10/2001 |

* cited by examiner

| ID | PROBLEM STATEMENT | PROBLEM STATEMENT ACCURACY | SOLUTION STATEMENT | SOLUTION STATEMENT ACCURACY | ... |
|---|---|---|---|---|---|
| ... | ... | ... | ... | ... | ... |
| 19986 | I HAVE A PROBLEM WITH MY MAILBOX, I CANNOT SEND EMAILS TO AN INTERNAL CONTACT. | 71% | THERE IS NO PROBLEM ON THE SERVER SIDE. PLEASE RESTART YOUR EMAIL APPLICATION AND CLICK "SYNC EMAILS." | 72% | ... |
| 19987 | I NEED YOU TO RESET MY ACTIVE DIRECTORY PASSWORD, THE ERROR MESSAGE WHEN I TRY TO LOGIN SAYS THAT IT IS EXPIRED. | 89% | YOUR NEW TEMPORARY PASSWORD HAS BEEN EMAILED TO YOU. THE SYSTEM WILL FORCE YOU TO CHANGE IT AT THE MOMENT OF YOUR NEXT LOGIN. | 88% | ... |
| ... | ... | ... | ... | ... | ... |

FIG. 10

METHODS AND SYSTEMS FOR ENSURING QUALITY OF UNSTRUCTURED USER INPUT CONTENT

BACKGROUND OF THE INVENTION

Field of the Invention

The present invention relates in general to computing systems, and more particularly, to various embodiments for ensuring the quality of unstructured user input content.

Description of the Related Art

Data analytics plays an essential role in discovering insights and enabling different forms and levels of automation. To realize automation opportunities pertaining to various computing systems that automatically interact with users (e.g., ticketing tools, virtual assistants, question answering systems, chatbots, etc.), it is important that these systems are trained on relevant topics for the users.

For example, one way of developing an understanding of what users need help on with respect to information technology (IT) equipment and environment (e.g. activities such as reset their passwords, unlock their accounts, how to perform certain tasks with their mailbox account, etc.) is to perform analysis on "tickets" data (i.e., retrieved via ticketing tools). Traditionally, organizations have undertaken periodic reviews of operations delivery data, typically on incidents and service requests. However, these were largely driven using structured ticket data fields. Even though this type of analysis may provide some preliminary information and indications of focus areas, often it only provides high-level insights. This is because single issues are captured and clustered under multiple/generic identifiers making unachievable to holistically analyzing them with the necessary level of detail.

SUMMARY OF THE INVENTION

Various embodiments for managing natural language user input are provided. Natural language input is received from a user utilizing a computing node. The natural language input is analyzed. The analyzing of the natural language input includes attempting to identify at least one of an intent associated with the natural language input, an entity associated with the natural language input, and context data associated with the natural language input. The natural language input is evaluated against a pre-trained model based on the analyzing of the natural language input. A quality score for the natural language input is calculated based on the evaluating of the natural language input. An action is caused to be performed utilizing the computing node based on the calculated quality score.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not, therefore, to be considered to be limiting of its scope, the invention will be described and explained with additional specificity and detail through the use of the accompanying drawings, in which:

FIG. 10 is a table of problem and solution pairs illustrating the storage thereof according to an embodiment of the present invention.

DETAILED DESCRIPTION OF THE DRAWINGS

Figure 1:
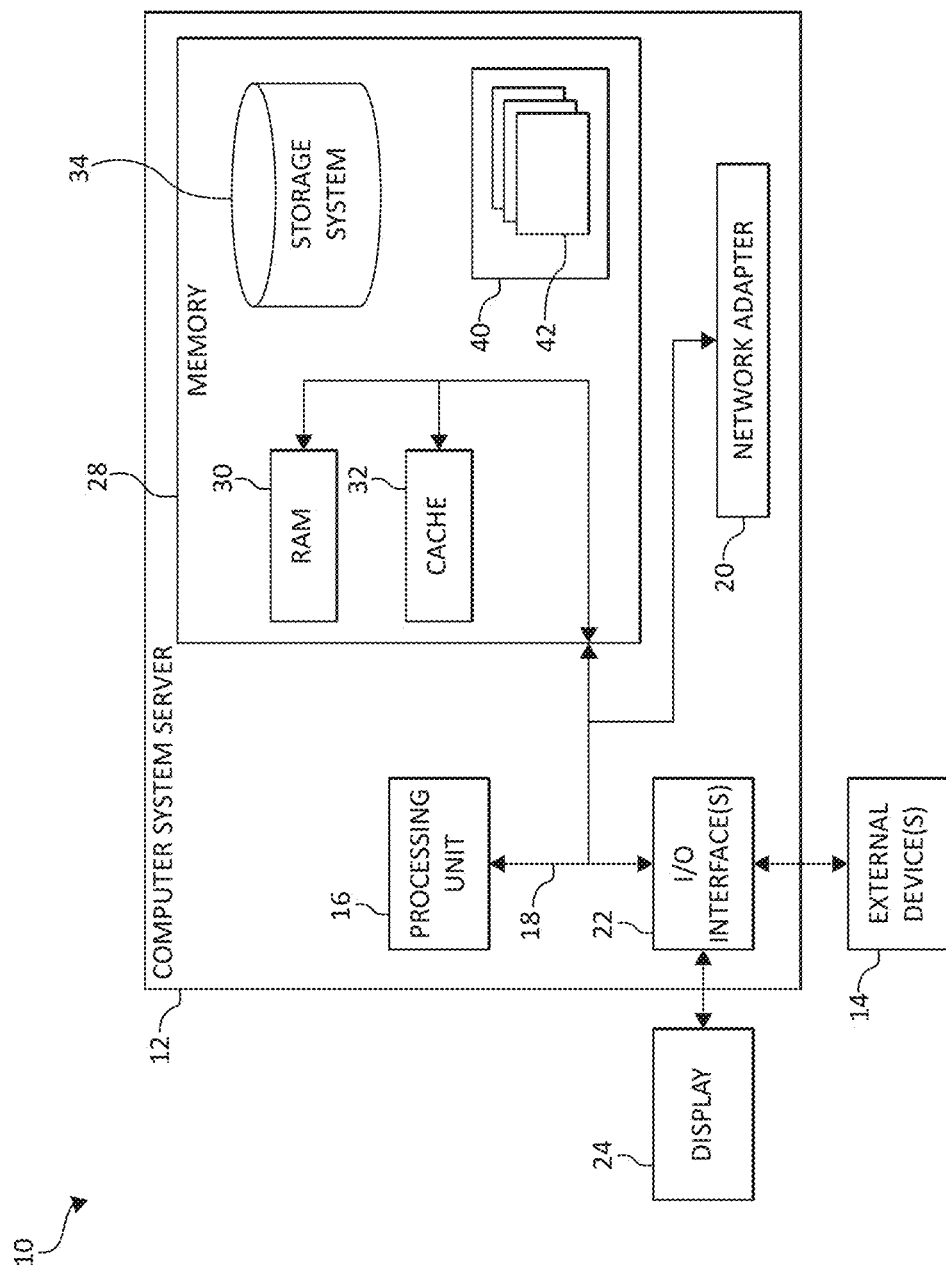
FIG. 1 is a block diagram depicting an exemplary computing node according to an embodiment of the present invention.

As discussed above, data analytics plays an essential role in discovering insights and enabling different forms and levels of automation. To realize automation opportunities pertaining to various computing systems that automatically interact with users (e.g., ticketing tools, virtual assistants, question answering systems, chatbots, etc.), it is important that these systems are trained on relevant topics for the users.

For example, one way of developing an understanding of what users need help on with respect to information technology (IT) equipment and environment (e.g. activities such as reset their passwords, unlock their accounts, how to perform certain tasks with their mailbox account, etc.) is to perform analysis on "tickets" data (i.e., retrieved via ticketing tools). Traditionally, organizations have undertaken periodic reviews of operations delivery data, typically on incidents and service requests. However, these were largely driven using structured ticket data fields. Even though this type of analysis may provide some preliminary information and indications of focus areas, often it only provides high-level insights. This is because single issues are captured and clustered under multiple/generic identifiers making unachievable to holistically analyzing them with the necessary level of detail.

To access new levels of insights, there is the need to go beyond previous analysis methods by extracting key meanings hidden within the fields where information is provided as freeform, in natural language (i.e., unstructured data). Specifically, this may be achieved by, for example, performing semantic analysis on ticket data, with the final goal being, for example, to correlate findings from the unstructured data with structured data.

Perhaps as important as the analysis method is the quality of the data available for the analysis (i.e., the principle of "garbage in, garbage out"). Historically this has been problematic because the general trend is to provide the minimum amount of information only, and then add any other information on demand. Such issues may be resolved to some extent but are not documented with the proper level of detail so that when semantic analyses are performed, the quality of the insights is very low. This is a problem, as the limited information available to guide the training of the virtual assistants may result in low user adoption of the systems.

To address these needs and/or the shortcomings in the prior art, in some embodiments described herein, methods and/or systems are disclosed that check the "quality" of natural language input (e.g., utterances or unstructured user input content) of users provided to various types of computing systems by analyzing and/or scoring the natural language input. Based on the analysis, the semantic meaning of the natural language input given the context, and/or the scoring, the system may perform one or more action, perhaps including prompting the user for additional information by, for example, preventing the user from proceeding (e.g., preventing the user from submitting the input), and/or providing the user with an indication of the quality (or quality score) of their input.

Although some embodiments described herein may be described with respect to "ticket" systems (or ticketing tools, issue tracking systems, request management systems, incident ticket systems, support management systems, etc.), it should be understood that the methods and systems described herein may be also be applied to other types of computing systems in which a user provides natural language input (e.g., via a user interface) and submits the natural language input to the computing system for processing and/or storage (e.g., question answering systems, chatbots, virtual assistants, etc.). It should also be understood that the input provided by the user(s) may take different forms. For example, the user may provide text-based natural language input manually (e.g., via a keyboard, mouse, etc.) or utilize voice commands/spoken utterances (e.g., via a microphone). However, the input may also include other types of content, such as images, video files, audio files, etc.

In some embodiments, with respect to ticketing tools, a control mechanism is provided that checks the quality of the text (or natural language input, utterance, etc.) which is provided/entered by the user, while documenting the issues and their corresponding resolutions in the ticketing tool. In accordance with some embodiments described herein, the "checking" is performed (e.g., perhaps in real-time) such that tickets cannot be closed and/or moved to the next stage in its workflow (i.e., the user is prevented from submitting the ticket/utterance) until a suitable amount of information is provided (i.e., by the user and/or the user's utterance) to ensure the subject and/or intent of the utterance (e.g., the user's issue/problem) is relatively completely/fully described and understood (or understandable) after checking the meaning, relevance, grammar, etc. This may facilitate the realization of the opportunities of automatic data analysis and high-quality insights described above (e.g., after a semantic analysis is performed on a given ticket or other type of utterance/input).

For example, with current ticketing tools, a ticket may be opened/started with the input "I have a problem" and closed/concluded with "issue resolved." In such a scenario, there is no information about the reported problem and how that problem was resolved. In contrast, utilizing the methods and systems described herein, tickets may not be open/closed with such little information, and users may be given feedback (e.g., in real-time) in terms of a quality score of their input and/or may not be allowed to process the ticket further until the quality level is equal or higher than a pre-defined threshold value (e.g., 70%). However, it should be understood that in some embodiments, no such feedback may be provided (e.g., a notification of the quality score is not generated, and the calculated quality score is only used for "backend" processing).

More generally, in some embodiments, methods and systems are provided that receive or detect natural language input entered by a user into a computing node (and/or a user interface implemented by a computing node). The natural language input is analyzed (e.g., via natural language understanding (NLU) and/or natural language processing (NLP)), and a quality (and/or completeness) score for the natural language input is calculated. Based on the calculated score, one or more actions are performed.

For example, if the calculated score does not exceed a predetermined threshold, the user may be prevented from continuing the process presented by the computing node or user interface (e.g., a "submit" or "proceed" button on the user interface may be deactivated or continued to be disabled) and/or a notification indicative of a request for additional information and/or input from the user may be generated (e.g., and rendered/displayed by the computing node/user interface). Likewise, if the calculated score exceeds the predetermined threshold, the user may be allowed to continue the process (e.g., the "submit" button may be activated, reactivated, enabled, etc. such that the user may submit the natural language input for processing, storage, etc.).

In some embodiments, a notification of the calculated quality score is generated and provided to the user (e.g., displayed by the computing node/user interface). For example, if the quality score is calculated as a percentage (or other numeric value or "grade"), the percentage may be displayed in the same user interface utilized by the user to enter/provide the natural language input (e.g., in or near a text box/field where the utterance is entered by the user).

As such, some embodiments described herein provided methods and/or systems for evaluating the quality of the input content (or natural language input) provided in a "freeform" (or unstructured) manner to computing nodes. A semantic analysis may be performed on the natural language input based on, for example, a generated input semantic model derived from the input and identified intents, entities, contextual data, and other attributes. The derived semantic model may be evaluated against a pre-trained model that is relevant to the specific domain (i.e., associated with the user's input and/or topic/subject of the input) or use case model(s). A scoring (or grading) algorithm may be applied to the input to calculate (or produce) quality score (or grade) that reflects the level of "quality" or "completeness" for the user's intended purpose (i.e., associated with the input). The score may be presented to the user (e.g., via the computing node and/or user interface), and further actions by the user may be prevented and/or allowed based on the score and/or quality/completeness level indicated by the score.

As will be appreciated by one skilled in the art, an "intent" may refer to the intention of the user as indicated in the natural language input. Intents may be mapped to corresponding responses or answers. For example, if the natural language input includes "I forgot my password," the intent (or intention) may be determined to be "I need to reset my password." In such an instance, the generated response may include providing the user with the steps needed to reset their password. Usually, intents are verbs and/or actions. Generally, an "entity" may refer to a person, place, thing/object, which may be a "topic" or a "subject" of the user's natural language input. For example, in an IT environment, the entity may be a specific application (e.g., a word processing application, email application, etc.), service (e.g., network connectivity), and/or device (e.g., XYZ laptop). In some embodiments, the more specific the entity reference is, the higher the calculated quality score will be. "Context" (or context data) may refer to any other data related to the natural language input that is accessible by the system. For example, context data may include other terms in the natural language input (i.e., besides the intent and entity), input provided in other fields, and/or information about the user (e.g., name, job title, previous interactions with the system, etc.). That is, context data may include any other information that may be utilized by the system to better understand the natural language input and/or the user's intention with respect to the natural language input.

In some embodiments, at least some of the functionality described herein is performed utilizing a cognitive analysis. The cognitive analysis may include classifying natural language, analyzing tone, and analyzing sentiment (e.g., scanning for keywords, key phrases, etc.) with respect to, for example, content and communications sent (and/or received) by users, and/or other available data sources. In some embodiments, natural language understanding (NLU), natural language processing (NLP), Mel-frequency cepstral coefficients (MFCCs) (e.g., for audio content), and/or region-based convolutional neural network (R-CNN) pixel mapping (e.g., for images/videos), as are commonly understood, are used. As such, it should be understood that the methods/systems described herein may be applied to content other than text-based (or alphanumeric) content but also audio content and/or images/videos.

The processes described herein may utilize various information or data sources associated with users (e.g., users who provide natural language input) and/or content. With respect to users, the data sources may include, for example, any available data sources associated with the user. For example, in some embodiments, a profile (e.g., a cognitive profile) for the user(s) may be generated. Data sources that may be used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in-person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, determine or specify context data, as described herein.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, managing natural language user input, as described herein. Utilizing the models, the performance (or operation) of the system (e.g., utilizing/based on new inputs) may be predicted and/or the performance of the system may be optimized by investigating how changes in the input(s) affect the output(s). Feedback received from (or provided by) users and/or administrators may also be utilized, which may allow for the performance of the system to further improve with continued use.

It should also be understood that as used herein, the term "computing node" (or simply "node") may refer to a computing device, such as a mobile electronic device or a desktop computer, and/or an application, such a ticketing system, chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing natural language user input, by a processor, is provided. Natural language input is received from a user utilizing a computing node. The natural language input is analyzed. The analyzing of the natural language input includes attempting to identify at least one of an intent associated with the natural language input, an entity associated with the natural language input, and context data associated with the natural language input. The natural language input is evaluated against a pre-trained model based on the analyzing of the natural language input. A quality score for the natural language input is calculated based on the evaluating of the natural language input. An action is caused to be performed utilizing the computing node based on the calculated quality score The analyzing of the natural language input may include dividing the natural language input into a plurality of chunks. The calculating of the quality score for the natural language input may be based on a summation of chunk quality scores calculated for each of the plurality of chunks. The chunk quality scores may be based on an evaluation of the respective chunk against intent and context pairs and entity and context pairs.

The action may include causing a notification of the calculated quality score to be provided to the user. If the calculated quality score is below a predetermined threshold, the action may include at least one of preventing the user from submitting the natural language input to a computing system and causing a notification of a request for additional natural language input from to be provided to the user. If the calculated quality score is above a predetermined threshold, the action may include allowing the user to submit the natural language input to a computing system. The causing of the action to be performed utilizing the computing node based on the calculated quality score may include causing the action to be performed if the calculated quality score is within a predetermined range.

The evaluating of the natural language input may include determining a minimum quality metric. The minimum quality metric may be associated with, for example, a user problem represented by the natural language input and include a type of problem, a relevant sub-category of the problem, and a software application related to the problem.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
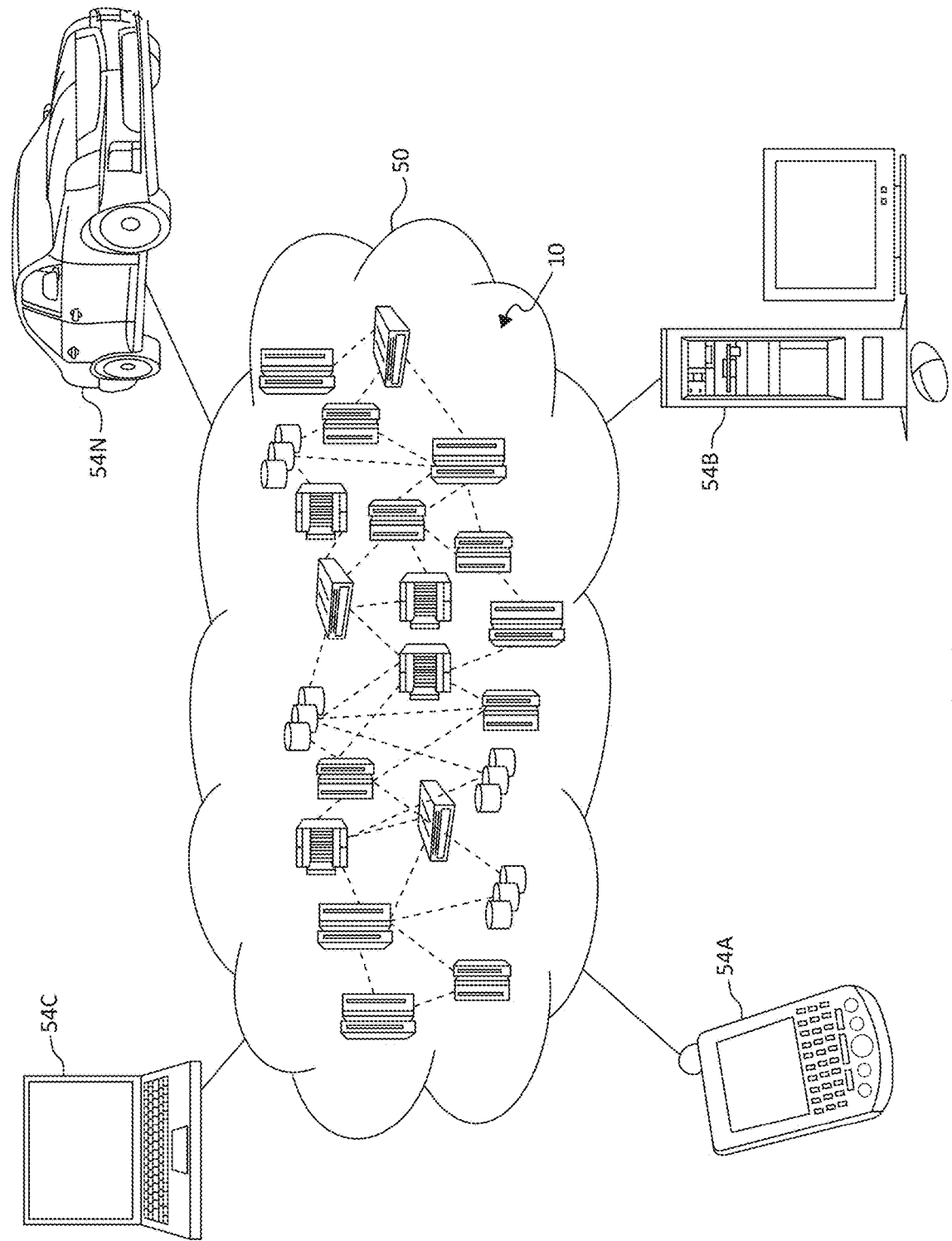
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
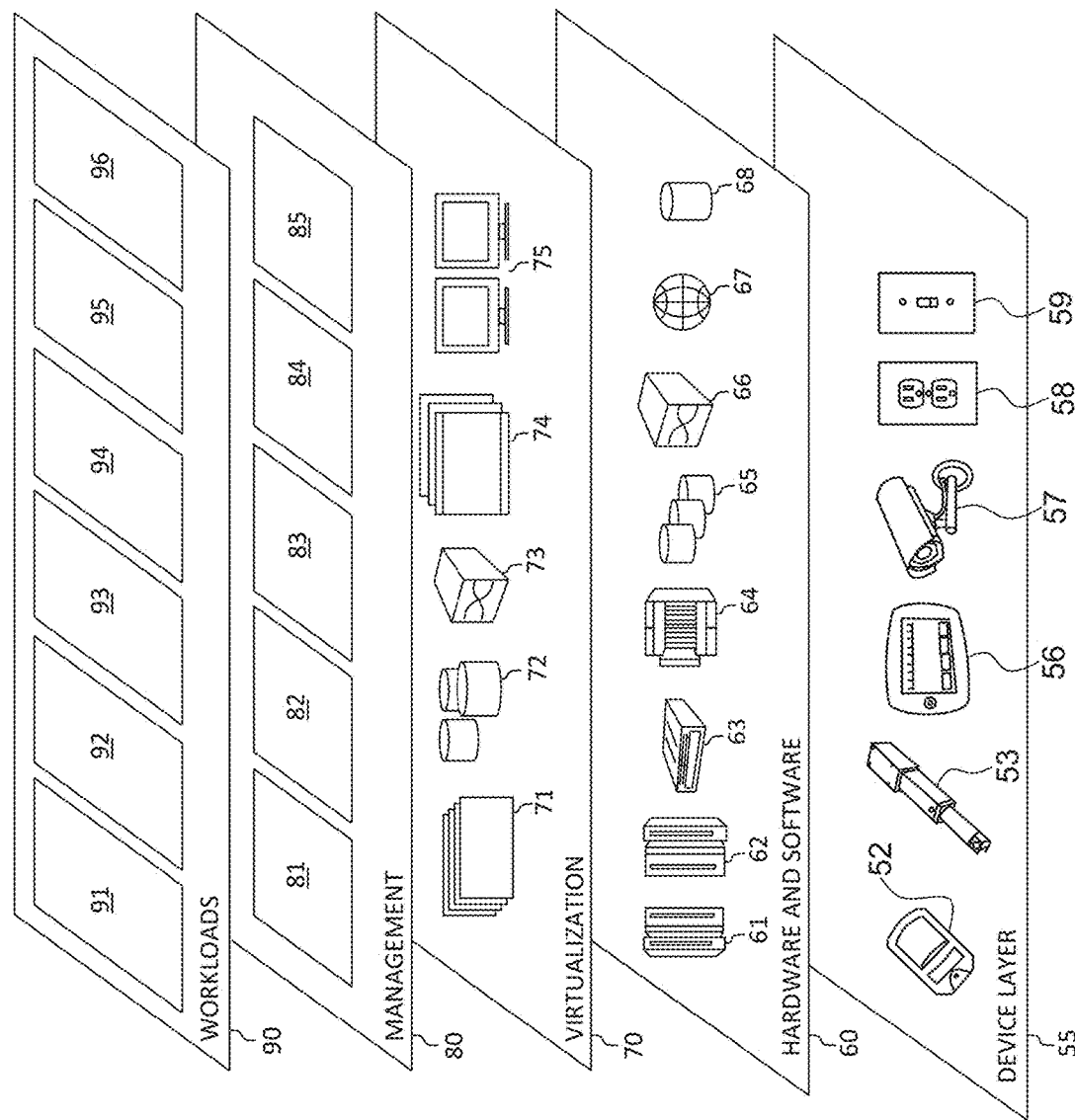
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote-control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74;

and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing natural language user input, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are disclosed that check the "quality" or "completeness" of natural language input (e.g., one or more utterance) of users provided to various types of computing systems by analyzing and/or scoring the natural language input. Based on the analysis. the semantic meaning of the natural language input given the context, and/or the scoring, the system may perform one or more action, perhaps including prompting the user for additional information, preventing the user from proceeding (e.g., preventing the user from submitting the input), and/or providing the user with an indication of the quality (or quality score) of their input.

Figure 4:
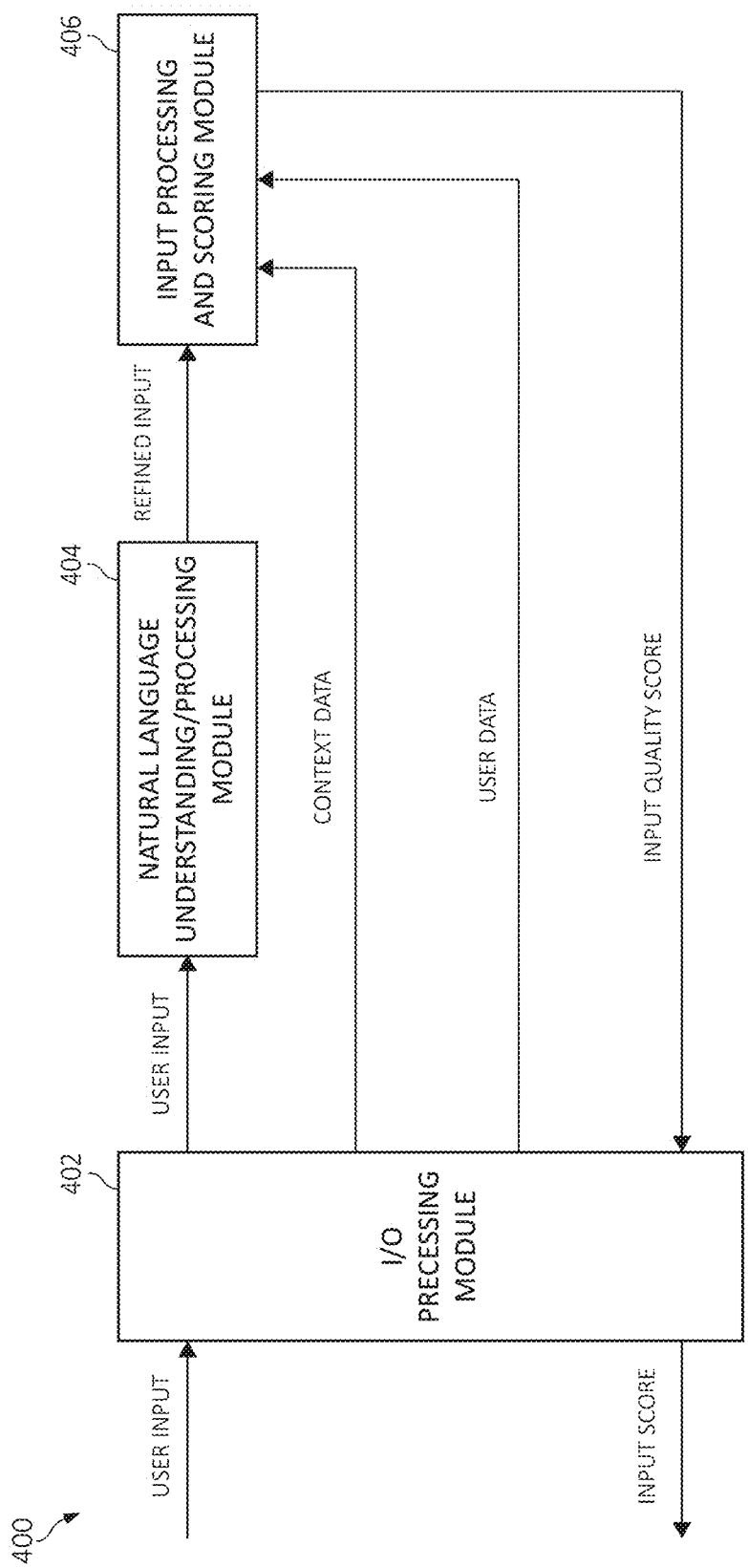
FIG. 4 is a block diagram of a system for managing natural language input according to an embodiment of the present invention.

FIG. 4 illustrates an exemplary computing system (and/or environment) 400 through which embodiments described herein (e.g., for managing natural language user input) may be implemented. The system 400 includes an input/output (I/O) processing module (or I/O module) 402, a natural language understanding/processing module (or NLU module) 404, and an input processing and scoring module (or scoring module) 406.

The I/O module 402 may be implemented utilizing any suitable computing device, such as those described above, and include one or more user input devices (e.g., a keyboard, mouse, etc.), rendering devices (e.g., a display screen and/or speaker(s)), and perhaps sensors (e.g., a microphone and/or camera). Generally, the I/O module 402 may be utilized by a user to provide natural language input or user input (e.g., one or more utterances) to the system via a user interface (e.g., displayed on the display screen) utilizing the user input device(s). Additionally, in some embodiments, the I/O module 402 may perform other functions with respect to natural language input, such as translating (e.g., from one natural/spoken language to another), grammar checking, correcting for typographical and/or spelling errors, etc. As described above, the system 400 may be utilized with various computing systems in which the user(s) provides natural language input, which is then processed and/or stored (e.g., ticketing tools, chatbots, question answering systems, virtual assistants, etc.).

The NLU module 404 and the scoring module 406 may be implemented utilizing any suitable computing nodes (e.g., computing devices and/or software applications) which may be integrated with the I/O module 402 (i.e., into the same computing device as the I/O module 402). However, in some embodiments, the components shown in FIG. 4 may be remote from each other and in operable communication via any suitable communication network (e.g., the Internet).

Generally, in some embodiments, the NLU module 404 and/or the scoring module 406 may be configured to analyze (e.g., via NLU, NLP, etc.) and score the natural language input provided by the user, as described herein. Specifically, in the example shown in FIG. 4, user input (or natural language input, utterance(s), etc.) provided by the user via the I/O processing module is sent to the NLU module 404, which processes the input, and provides refined input to the scoring module 406. As shown, the scoring may also be based on context data and user data received from the I/O module. The context data may include, for example, other information provided by the user and/or available to the system 400 via the user interface (e.g., terms in the natural language input besides identified intents and entities, input provided to other fields in the user interface which may be useful in determining the context of the natural language input, etc.). The user data (which may be considered to be a portion of the context data) may include any other information associated with the user (e.g., name, ID, job title, previous interactions with the system, previously submitted natural language input, etc.).

As shown, after calculating the input quality score, such may be provided to the I/O module 402 (via a generated signal representative thereof). The I/O module 402 may generate a notification of the input score (or input quality score) and provide the notification to the user (e.g., display the notification in the user interface or some other means, such as an electronic communication), perhaps in combination with performing other actions as described herein (e.g., preventing or allowing the user to submit the natural language input, requesting additional information/natural language input from the user, etc.).

Figure 5:
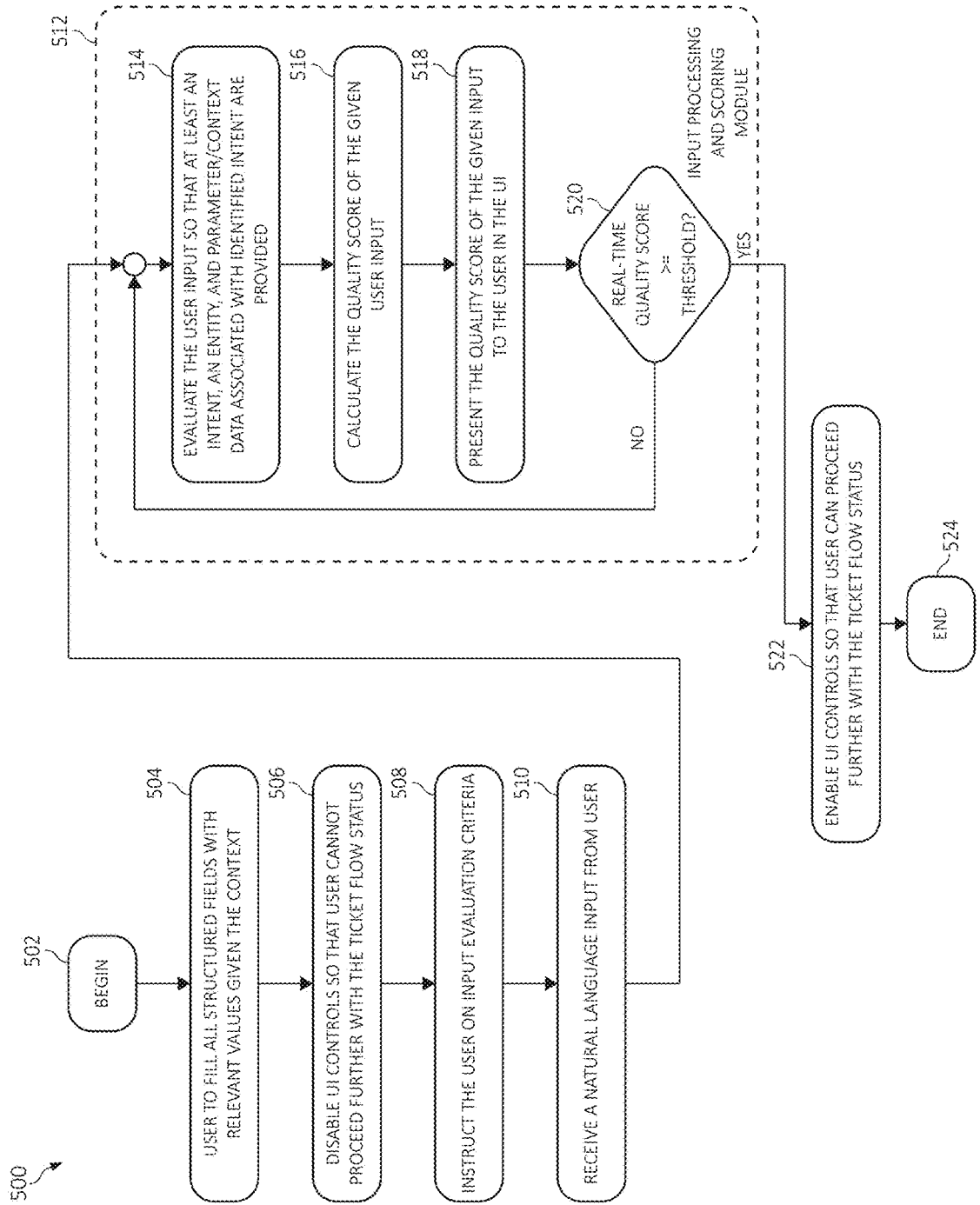
FIG. 5 is a block diagram of a method for managing natural language input according to an embodiment of the present invention.

FIG. 5 illustrates an exemplary method (and/or system) 500 for managing natural language input according to an embodiment of the present invention. The method 500 may be performed by, for example, the system 400 shown in FIG. 4. At block 502, the method 500 begins with, for example, a system such as those described herein being implemented on a suitable computing device or combination of computing devices, perhaps along with a user interface being provided to a user (e.g., rendered on a display device). In the particular embodiment shown, the method 500 is related to a ticketing tool, but as described above, the methods/systems described herein may be applied to other types of systems (e.g., chatbots, etc.).

At block 504, a user begins to fill out one or more fields in the user interface with relevant values given the particular context or scenario. The fields may include multiple fields for ancillary/contextual information (e.g., user name, topics, related entities, etc.), perhaps in text boxes or via pull-down menus, along with a primary field for providing natural language input (e.g., an utterance, freeform text, etc.). In the particular example shown, at block 506, at least some of the user interface controls are disabled so that the user can not proceed further with the ticket flow process (i.e., until the quality score calculated for the natural language input exceeds a predetermined threshold). For example, the user interface may include a "submit" button (which may be actuated utilizing a keyboard and/or mouse) that is deactivated (and perhaps "greyed out" or "dimmed") until the calculated quality score exceeds the threshold, as described below. However, it should be understood that such functionality (e.g., performed at block 506) may not be utilized in some embodiments.

In the embodiment shown, at block 508, the user is provided with instructions regarding any evaluation criteria. For example, in a ticketing system related to IT, the user interface may provide instructions that indicate that the user should specify what sort of problem they're having, the application/service involved, and the particular functionality of the application/service is causing the problem. At block 510, natural language input is received from the user in any suitable manner (e.g., via keyboard, mouse, microphone, etc.), which may be provided into the primary field as described above.

The natural language input is then processed by an input processing and scoring module (and/or a NLU/NLP module) 512, such as described above. In particular, at block 514, the natural language input is evaluated and/or analyzed (e.g., via NLU, NLP, etc.) so that at least an intent, an entity, and parameter/context data associated with the intent are provided. In other words, the analyzing of the natural language input may include attempting to identify an intent, entity, and context data within the natural language input.

At block 516, a quality score for the natural language input is calculated (e.g., based on the analysis performed at block 514), as described below in greater detail. At block 518, the calculated quality score is presented (or provided) to the user (e.g., as feedback). For example, a notification of the calculated score may be rendered in the user interface. Such a notification may be rendered in various ways. For example, if the score is calculated as a numeric value (e.g., a percentage), the numeric value may be displayed in the user interface (e.g., regardless of whether or not the score exceeds any predetermined threshold). As another example, the manner in which the text of the natural language input is rendered may change (e.g., in real-time) based on the score.

At block 520, the calculated quality score is compared to a predetermined threshold. If the calculated score does not meet (and/or exceed) the predetermined threshold, the method 500 returns to block 514 (and/or block 510) such that the user may provide additional natural language input (e.g., after the user is provided with an indication of such). If the calculated score meets (and/or exceeds) the predetermined threshold, in the depicted embodiment, at block 522, the disabled user interface control(s) (if previously deactivated/disabled) are reactivated (e.g., so that the user can proceed further with the ticket flow process). For example, if a "submit" button was previously deactivated, it may then be reactivated (and perhaps displayed in a "normal" or "non-dimmed") manner. At block 524, the method 500 ends with, for example, the natural language input (along with any other input provided by the user via the user interface) being submitted or provided for processing and/or storage (perhaps including providing a response/reply to the user in response to the submitted natural language input).

Figure 8:
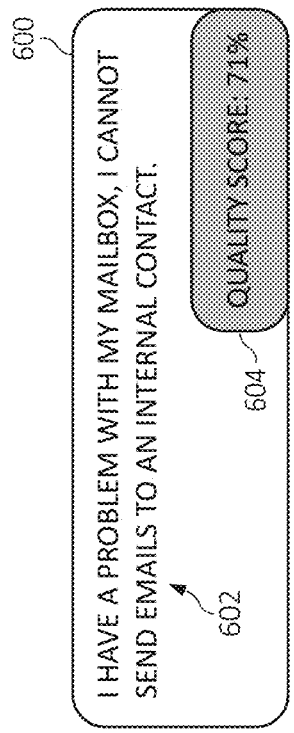
FIGS. 6-8 are plan views of a portion of a user interface according to an embodiment of the present invention.
Figure 6:
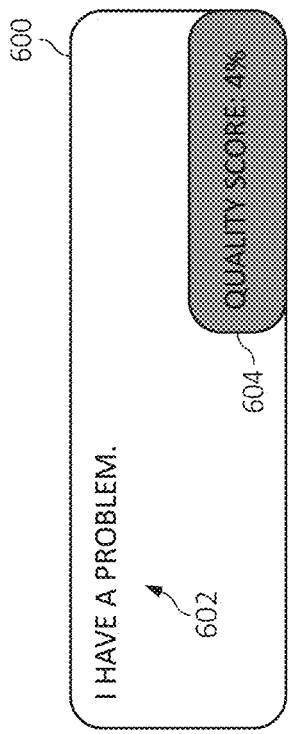
Figure 7:
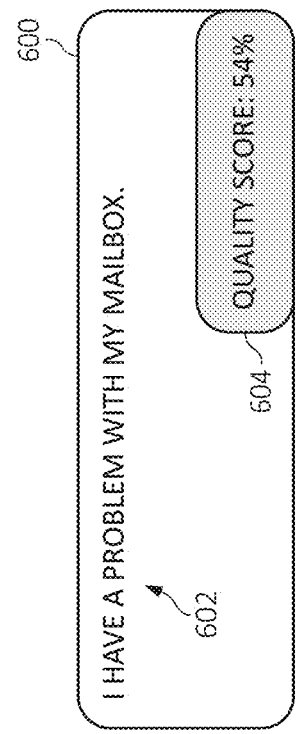

FIGS. 6, 7, and 8 illustrate a portion of a user interface according to an embodiment of the present invention. In particular, FIGS. 6, 7, and 8 illustrate a text box (or field) 600 (e.g., a primary field of a user interface) with natural language input 602 having been provided by a user and an indication 604 of a calculated quality displayed therein. More specifically, as shown in FIG. 6, the user has entered the natural language input "I have a problem" into the text box 600. In response, the system has calculated a quality score of 4% (e.g., out of a possible 100%), as shown within the indication 604. It should also be noted that the indication 604 is displayed in a first manner (e.g., a first color) in FIG. 6. Such a relatively low quality score may be calculated because, for example, the system may only be able to identify an intent within the natural language input (but no entity or context data).

Referring now to FIG. 7, the natural language input 602 has been augmented (e.g., by the user in response to the notification shown in FIG. 6) to read "I have a problem with my mailbox." In response, the system has calculated a quality score of 54% and displayed such with the indication 604. Such a change in the scoring may be performed essentially in real-time. That is, as the user augments the natural language input, the system may continue to process the input and change the indicated score if/when appropriate. It should also be noted that the indication 604 may be displayed in a second manner (e.g., a second color) in FIG. 7 (i.e., reflective of the increase in the calculated quality score). Such a "mid-range" quality score may be calculated because, for example, the system may be able to identify an intent and an entity within the natural language input (but no context data).

Referring now to FIG. 8, the natural language input 602 has been further augmented to read "I have a problem with my mailbox, I can not send emails to an internal contact." In response, the system has calculated a quality score of 71% and displayed such with the indication 604. Again, such a change in the scoring may be performed essentially in real-time, as the user augments the natural language input. It should also be noted that the indication 604 may be displayed in a third manner (e.g., a third color) in FIG. 8 (i.e., reflective of the further increase in the calculated quality score). Such a relatively high quality score may be calculated because, for example, the system may be able to identify an intent, an entity, and context data associated with the natural language input.

As described above, other actions may be performed by the system based on the calculated quality score (perhaps in addition to providing the calculated score to the user). For example, referring again to FIG. 6, in such an instance (i.e., with a relatively low quality score), the user may be prevented from continuing in the relevant process (e.g., submitting the ticket for processing). However, in the scenario shown in FIG. 7, given the mid-range quality score, the user may be allow to continue the process, but may be provided with a request for additional information (e.g., after the user clicks a "submit" button, a notification indicative of a request for additional information/natural language input may be provided/displayed in the user interface). Likewise, in the scenario shown in FIG. 8, given the relatively high quality score, the user may be allowed to continue the process without any notifications for additional information being provided.

That is, the methods and systems described herein may cause actions to be performed based on "tiers" or "ranges" of the calculated quality scores. For example, if the calculated quality score is within a particular (or predetermined) range (e.g., between 60% and 80%), the system may provide a notification of a request for additional information and/or suggest information/data that may be added to improve the score (e.g., "You mentioned a problem accessing server XYZ on the network. However, including the name of the folder you were trying to access may help us resolve your issue faster"). In some embodiments, different actions may be performed when the calculated quality score is within different ranges (e.g., if the quality score is between 50% and 70%, a first action or first set of actions may be performed, and if the quality score is between 30% and 50%, a second action or second set of actions may be performed).

As such, from a language and meaning perspective, the methods and systems described herein may be considered to "force" users to provide meaningful information that may then be leveraged by any analysis method. In some embodiments utilized with respect to ticketing tools, the user may be prevented from submitting a ticket or otherwise continuing the process until the user utterance meets and/or exceeds the desired pre-established threshold of quality level. However, as described above, these methods and systems may be applied to any domains and/or other types of systems (e.g., chatbots, virtual assistants, cognitive agents, etc.). Using the methods and systems described herein, the checks performed may dramatically enhance the quality of the received data thereby creating a good baseline for analytics and automation opportunities.

Figure 9:
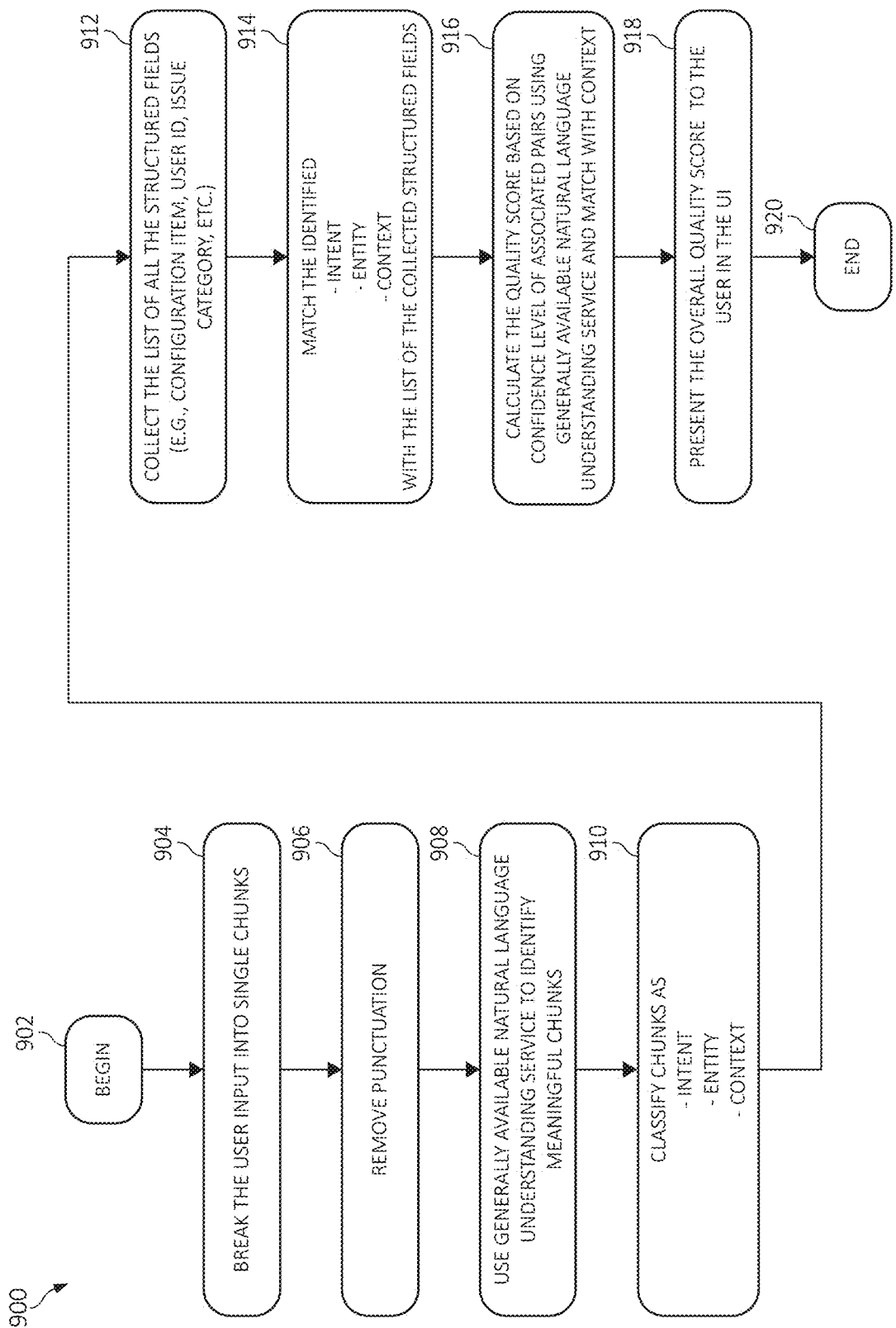
FIG. 9 is a block diagram of a method for analyzing natural language input according to an embodiment of the present invention.

FIG. 9 illustrates a method 900 for analyzing natural language input according to an embodiment of the present invention. The method 900 may be performed by, for example, the NLU module 404 and/or the scoring module 406 of FIG. 4.

The method 900 begins at block 902 with, for example, natural language input being provided by a user (e.g., via a computing node and/or user interface). At block 904, the natural language input (or input) is broken (or divided, etc.) into "chunks," as is commonly understood. At block 906, the punctuation (if any) is removed from the natural language input. At block 908, NLU is utilized to identify meaningful chunks, and at block 910, each of the chunks is classified (or at least attempted to be classified) as an intent, an entity, or context/context data.

The process performed at blocks 904-910 may include performing a shallow (or "light") parsing analysis of the input, as is commonly understood. Such a process may include identifying constituent parts of the natural language input (e.g., nouns, verbs, adjectives, etc.) and linking them to higher order units that have discrete grammatical meanings (e.g., noun groups or phrases, verb groups, etc.). While the most elementary chunking algorithms simply link constituent parts on the basis of elementary search patterns (e.g. as specified by regular expressions), approaches that use machine learning techniques (e.g., classifiers, topic modeling, etc.) may take contextual information into account and thus compose chunks in such a way that they better reflect the semantic relations between the basic constituents. That is, these more advanced methods may bypass the problem that combinations of elementary constituents may have different higher-level meanings depending on the context of the input (e.g., sentence(s), phase(s), etc.).

At block 912, a list of all of the structured fields (e.g., configuration item, user ID, issue category, etc.) is collected. This information may be used to generate a pre-trained model relevant to the specific domain or topic of the natural language input. At block 914, the intent(s), entity (or entities), and context data (or semantic model) of the natural language input is matched (or at least attempted to be matched) to the collected structured fields (or the semantic model derived for the natural language input is evaluated against the pre-trained model).

Based on this evaluation, at block 916, a quality score for the natural language input is calculated. More specifically, the quality score may be based on, for example, a confidence level of associated pairs determined using NLU and matching of the pairs with a context. For example, the quality score for the natural language input may be determined as the total (or summation) of a quality score for each of the individual chunks. The quality score for each of the individual chunks may be evaluated against (or scored based on) intent and context pair and entity and context pairs. Specifically, the overall quality score for a natural language input may be expressed as: combine (quality score of single chunks). The quality score of single chunks may be expressed as: sum (chunk (has a meaning), chunk (has a match)). "Has a meaning" may refer to a confidence level returned by a NLU process, and "has a match" may be expressed as: sum (keyword match (intent, context pairs), keyword match (entity, context pairs)). In some embodiments, each calculation may be normalized so that numbers (or values) between 0 and 1 are returned, which if multiplied by 100, cause numbers between 0 and 100 to generated (thereby determining the intended feedback to be provided to the user based on user input). However, it should be understood that in some embodiments, the quality score may be determined and/or returned as a "grade" or "description" (e.g., "low," "high," etc.).

At block 918, the quality score is presented (or provided) to the user (e.g., via the user interface), as described above. The method 900 ends at block 920 with, for example, another action being performed (e.g., the user being allowed to continue the process, the user being prevented from continuing the process, etc., as described above).

As one example of natural language input provided by a user (to be utilized by any of the methods and/or systems described above), consider the utterance "Starting from this morning I can not log in to the HR system." Give such natural language input, the intent may be identified as "can not log in," and the entity may be identified as "HR system." Context data (which may be extracted from other fields in the user interface, user profile, etc.) may include such items as "impacted user: Bill Smith," "category: password reset," and "configuration item: Company XYZ HR system."

As described above, the input provided by the user may include other forms of unstructured data. For example, one or more image may be provided by the user (e.g., uploaded via the user interface). As a specific example, a user may upload an image that shows a screenshot of an error message they are encountering. In such instances, the system may derive additional information/details (e.g., as context data) to complement the semantic model extracted from the language input (e.g., hostname, IP address, etc.).

When implemented with respect to a ticketing tool, the produced (or provided) unstructured data (e.g., natural language inputs) may be stored within database fields that may be available with such systems (e.g., within "back end" ticketing tool architecture). However, when implemented with other types of systems, "problem" (or request) and "solution" (or response) pairs may be generated, as shown in table 1000 in FIG. 10. As shown, the pairs may be stored along with respective confidence levels that may be used "live" (or in real-time) or offline in different manners for various data analytics automation purposes.

Such data (e.g., structured in such a manner) may be utilized to train various types of systems (e.g., chatbots, etc.) so that the systems are automatically trained with problem (or command) and solution (or response) pairs for a given domain (e.g., a particular client, environment, etc.). With the methods and systems described herein applied to next level problems pertaining to storage, similar results may be obtained (e.g., a database of problem and solution pairs), which may be used to perform the training of any automation system that may, based on a comprehensive problem statement, advise users on the best way to proceed (i.e., to solve their problem/issue) and/or activate another specialized automation tool capable of performing the steps contained in the solution statement (and so on and so forth).

Figure 11:
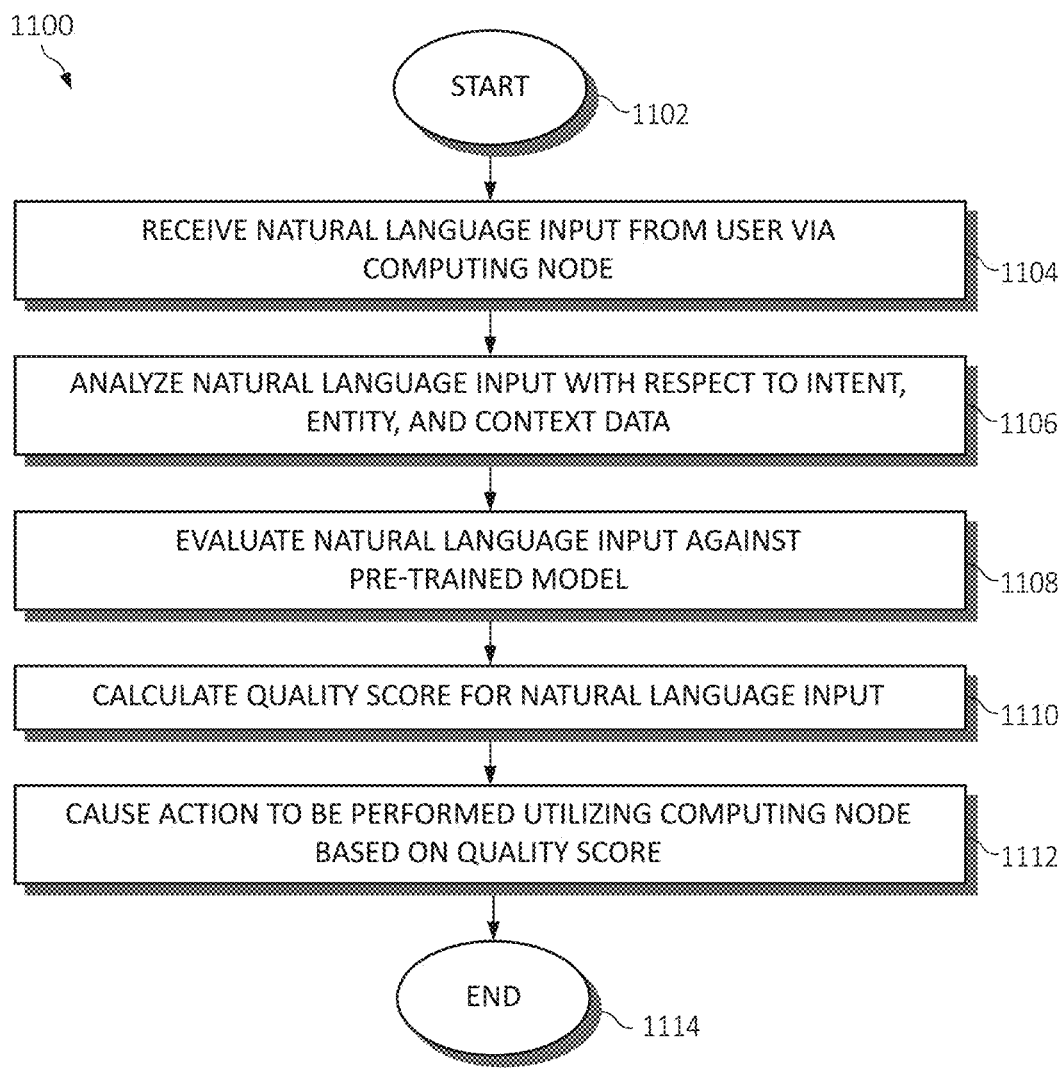
FIG. 11 is a flowchart diagram of an exemplary method for managing natural language input according to an embodiment of the present invention.

Turning to FIG. 11, a flowchart diagram of an exemplary method 1100 for managing natural language user input is provided. The method 1100 begins (step 1102) with, for example, a computing node and/or user interface being provided to a user, through which the user may provide natural language input (or one or more utterance).

Natural language input is received from a user utilizing the computing node (and/or user interface) (step 1104). The natural language input may be received utilizing any suitable user input device (e.g., a keyboard, mouse, etc.) and/or sensor (e.g., microphone and/or camera) and be text-based and/or include images, audio files, video files, etc.

The natural language input is analyzed (step 1106). The analyzing of the natural language is at least performed with respect to an intent, an entity, and contextual data associated with the natural language input. That is, the analysis may include attempting to identify at least one of an intent associated with the natural language input, an entity associated with the natural language input, and context data associated with the natural language input. The analyzing of the natural language input may include dividing the natural language input into a plurality of chunks.

The natural language input is evaluated against a pre-trained model based on the analyzing of the natural language input (step 1108). The evaluating of the natural language input may include determining a minimum quality metric. The minimum quality metric may be associated with a user problem represented by the natural language input and include a type of problem, a relevant sub-category of the problem, and a software application related to the problem.

A quality score for the natural language input is calculated based on the evaluating of the natural language input (step 1110). The calculating of the quality score for the natural language input may be based on a summation of chunk quality scores calculated for each of the plurality of chunks. The chunk quality scores may be based on an evaluation of the respective chunk against intent and context pairs and entity and context pairs.

An action (or one or more actions) is caused to be performed utilizing the computing node based on the calculated quality score (step 1112). The action(s) may include causing a notification of the calculated quality score to be provided to the user. If the calculated quality score is below a predetermined threshold, the action(s) may include at least one of preventing the user from submitting the natural language input to a computing system and causing a notification of a request for additional natural language input to be provided to the user. If the calculated quality score is above a predetermined threshold, the action(s) may include allowing the user to submit the natural language input to a computing system. The causing of the action to be performed may include causing the action to be performed if the calculated quality score is within a predetermined range.

As such, it should be understood that the action(s) performed based on the calculated quality score may not only include providing the user with feedback, but may (also) be related to advancement/change in a workflow. In a ticketing system, this may allow a user to submit the same to a resolver group, but if applied in a different type of domain or system, a generic action may be performed according to the system and the context.

Method 1100 ends (step 1114) with, for example, the natural language input being submitted for processing and/or storage, as described above. In some embodiments, feedback from users may be utilized to improve the performance of the system over time.

The present invention may be a system, a method, and/or a computer program product. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowcharts and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing natural language user input, by a processor, comprising:
receiving natural language input from a user in a field of a user interface of a computing node;
analyzing the natural language input, wherein the analyzing of the natural language input includes dividing the natural language input into a plurality of chunks, and further attempting to identify an intent associated with the natural language input, an entity associated with the natural language input, and context data associated with the natural language input, the context data identified from input to alternative fields on the user interface, and wherein each of the plurality of chunks is classified as one of the intent, the entity, and the context data;
evaluating the natural language input against a pre-trained model based on the analyzing of the natural language input;

in conjunction with the evaluating, matching an intent chunk with a context chunk to create an intent and context pair, and matching an entity chunk with the context chunk to create an entity and context pair;

calculating a quality score for the natural language input by summing respective chunk quality scores calculated for each chunk of the intent and context pair with respective chunk quality scores calculated for each chunk of the entity and context pair, wherein the respective chunk quality scores are evaluated against the intent and context pair and the entity and context pair, and wherein the respective chunk quality scores are representative of a confidence that the intent and context pair infers that some of the plurality of chunks have an intended meaning and the context pair infers that the some of the plurality of chunks have a contextual match to the intended meaning; and causing an action to be performed utilizing the computing node based on the calculated quality score.

2. The method of claim 1, wherein the action includes causing a notification of the calculated quality score to be provided to the user.

3. The method of claim 1, wherein if the calculated quality score is below a predetermined threshold, the action includes at least one of preventing the user from submitting the natural language input to a computing system and causing a notification of a request for additional natural language input from to be provided to the user, and if the calculated quality score is above a predetermined threshold, the action includes allowing the user to submit the natural language input to the computing system.

4. The method of claim 1, wherein the causing of the action to be performed utilizing the computing node based on the calculated quality score includes causing the action to be performed if the calculated quality score is within a predetermined range.

5. The method of claim 1, wherein the evaluating of the natural language input includes determining a minimum quality metric.

6. The method of claim 5, wherein the minimum quality metric is associated with a user problem represented by the natural language input and includes a type of problem, a relevant sub-category of the problem, and a software application related to the problem.

7. A system for managing natural language user input comprising:
a processor executing instructions stored in a memory device, wherein the processor:
receives natural language input from a user in a field of a user interface of a computing node;
analyzes the natural language input, wherein the analyzing of the natural language input includes dividing the natural language input into a plurality of chunks, and further attempting to identify an intent associated with the natural language input, an entity associated with the natural language input, and context data associated with the natural language input, the context data identified from input to alternative fields on the user interface, and wherein each of the plurality of chunks is classified as one of the intent, the entity, and the context data;
evaluates the natural language input against a pre-trained model based on the analyzing of the natural language input;
in conjunction with the evaluating, matches an intent chunk with a context chunk to create an intent and context pair, and matching an entity chunk with the context chunk to create an entity and context pair;
calculates a quality score for the natural language input by summing respective chunk quality scores calculated for each chunk of the intent and context pair with respective chunk quality scores calculated for each chunk of the entity and context pair, wherein the respective chunk quality scores are evaluated against the intent and context pair and the entity and context pair, and wherein the respective chunk quality scores are representative of a confidence that the intent and context pair infers that some of the plurality of chunks have an intended meaning and the context pair infers that the some of the plurality of chunks have a contextual match to the intended meaning; and
causes an action to be performed utilizing the computing node based on the calculated quality score.

8. The system of claim 7, wherein the action includes causing a notification of the calculated quality score to be provided to the user.

9. The system of claim 7, wherein if the calculated quality score is below a predetermined threshold, the action includes at least one of preventing the user from submitting the natural language input to a computing system and causing a notification of a request for additional natural language input from to be provided to the user, and if the calculated quality score is above a predetermined threshold, the action includes allowing the user to submit the natural language input to the computing system.

10. The system of claim 7, wherein the causing of the action to be performed utilizing the computing node based on the calculated quality score includes causing the action to be performed if the calculated quality score is within a predetermined range.

11. The system of claim 7, wherein the evaluating of the natural language input includes determining a minimum quality metric.

12. The system of claim 11, wherein the minimum quality metric is associated with a user problem represented by the natural language input and includes a type of problem, a relevant sub-category of the problem, and a software application related to the problem.

13. A computer program product for managing natural language user input, by a processor, the computer program product embodied on a non-transitory computer-readable storage medium having computer-readable program code portions stored therein, the computer-readable program code portions comprising:
an executable portion that receives natural language input from a user in a field of a user interface of a computing node;
an executable portion that analyzes the natural language input, wherein the analyzing of the natural language input includes dividing the natural language input into a plurality of chunks, and further attempting to identify an intent associated with the natural language input, an entity associated with the natural language input, and context data associated with the natural language input, the context data identified from input to alternative fields on the user interface, and wherein each of the plurality of chunks is classified as one of the intent, the entity, and the context data;
an executable portion that evaluates the natural language input against a pre-trained model based on the analyzing of the natural language input;

an executable portion that, in conjunction with the evaluating, matches an intent chunk with a context chunk to create an intent and context pair, and matching an entity chunk with the context chunk to create an entity and context pair;

an executable portion that calculates a quality score for the natural language input by summing respective chunk quality scores calculated for each chunk of the intent and context pair with respective chunk quality scores calculated for each chunk of the entity and context pair, wherein the respective chunk quality scores are evaluated against the intent and context pair and the entity and context pair, and wherein the respective chunk quality scores are representative of a confidence that the intent and context pair infers that some of the plurality of chunks have an intended meaning and the context pair infers that the some of the plurality of chunks have a contextual match to the intended meaning; and an executable portion that causes an action to be performed utilizing the computing node based on the calculated quality score.

14. The computer program product of claim 13, wherein the action includes causing a notification of the calculated quality score to be provided to the user.

15. The computer program product of claim 13, wherein if the calculated quality score is below a predetermined threshold, the action includes at least one of preventing the user from submitting the natural language input to a computing system and causing a notification of a request for additional natural language input from to be provided to the user, and if the calculated quality score is above a predetermined threshold, the action includes allowing the user to submit the natural language input to the computing system.

16. The computer program product of claim 13, wherein the causing of the action to be performed utilizing the computing node based on the calculated quality score includes causing the action to be performed if the calculated quality score is within a predetermined range.

17. The computer program product of claim 13, wherein the evaluating of the natural language input includes determining a minimum quality metric.

18. The computer program product of claim 17, wherein the minimum quality metric is associated with a user problem represented by the natural language input and includes a type of problem, a relevant sub-category of the problem, and a software application related to the problem.

* * * * *